(12) United States Patent
Kuromizu

(10) Patent No.: US 8,297,773 B2
(45) Date of Patent: Oct. 30, 2012

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 418 days.

(21) Appl. No.: 12/738,296

(22) PCT Filed: Jun. 2, 2008

(86) PCT No.: PCT/JP2008/060143
§ 371 (c)(1),
(2), (4) Date: Apr. 16, 2010

(87) PCT Pub. No.: WO2009/050916
PCT Pub. Date: Apr. 23, 2009

(65) Prior Publication Data
US 2010/0231806 A1    Sep. 16, 2010

(30) Foreign Application Priority Data
Oct. 19, 2007  (JP) .................................. 2007-272697

(51) Int. Cl.
G02F 1/1335  (2006.01)
F21V 7/00    (2006.01)
(52) U.S. Cl. .......... 362/97.2; 362/225; 362/241; 349/67
(58) Field of Classification Search .................. 362/97.1, 362/225, 97.2, 241, 97.3, 614; 349/63, 67, 349/70
See application file for complete search history.

(56) References Cited

U.S. PATENT DOCUMENTS

| 7,044,629 | B2 * | 5/2006 | Moon ........................... 362/634 |
| 7,159,999 | B2 * | 1/2007 | Yoo et al. ................. 362/249.01 |
| 7,380,958 | B2 * | 6/2008 | Jeong ........................... 362/225 |
| 7,455,425 | B2 * | 11/2008 | Inoue et al. ..................... 362/241 |
| 7,710,515 | B2 * | 5/2010 | Ohshima et al. ................. 349/67 |
| 2005/0195619 | A1 | 9/2005 | Tseng et al. |
| 2006/0044830 | A1 | 3/2006 | Inoue et al. |
| 2010/0238359 | A1 | 9/2010 | Kuromizu |

FOREIGN PATENT DOCUMENTS

| JP | 2000-029411 |   | 1/2000 |
| JP | 2002-082626 |   | 3/2002 |
| JP | 2002-116705 | * | 4/2002 |
| JP | 2002-196326 |   | 7/2002 |
| JP | 2004-206906 |   | 7/2004 |
| JP | 2004-220980 |   | 8/2004 |
| JP | 2004-354533 |   | 12/2004 |
| JP | 3642723 |   | 2/2005 |
| JP | 2007-280915 |   | 10/2007 |
| WO | WO 2004/031647 |   | 4/2004 |

* cited by examiner

Primary Examiner — Peggy A. Neils
(74) Attorney, Agent, or Firm — Nixon & Vanderhye P.C.

(57) ABSTRACT

The backlight device 12 of the present invention includes a plurality of tubular light sources 17 provided in a parallel arrangement and a light reflecting member 20 arranged on a opposite side from an illuminating side that is illuminated with light from the light sources 17. The arrangement of the tubular includes a narrow pitch area 17a in which an arrangement interval is relatively small and a wide pitch area 17b in which an arrangement interval is relatively large. A dot pattern including a plurality of dots 22 is formed on the light reflecting member 20. Light reflectivity of the dots 22 is different from that of the light reflecting member 20. Light reflectivity of a light reflecting surface including surfaces of the light reflecting member and the dot pattern is low in the narrow pitch area 17a than in the wide pitch area 17b.

22 Claims, 19 Drawing Sheets

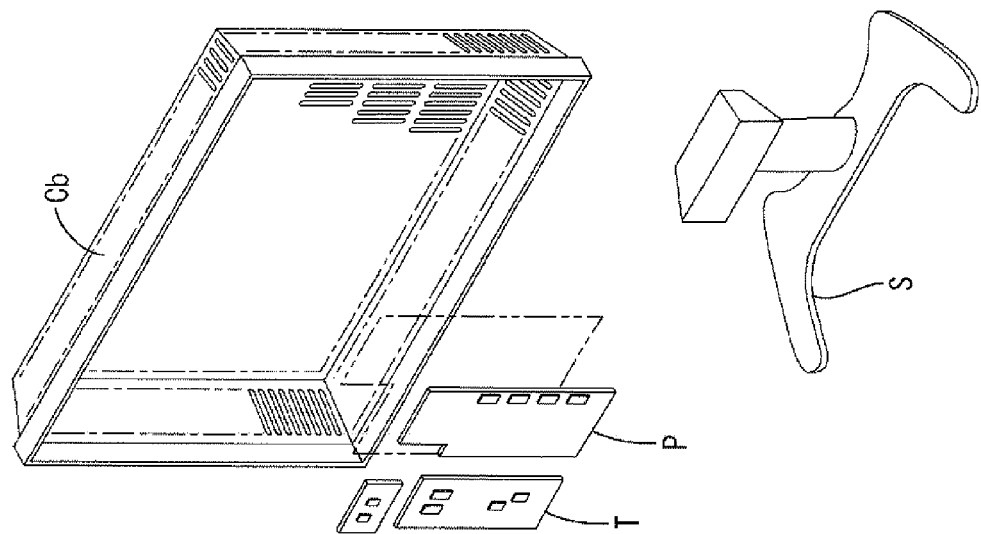
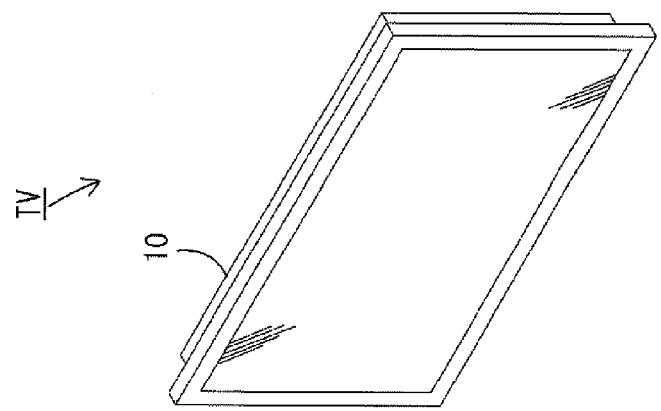
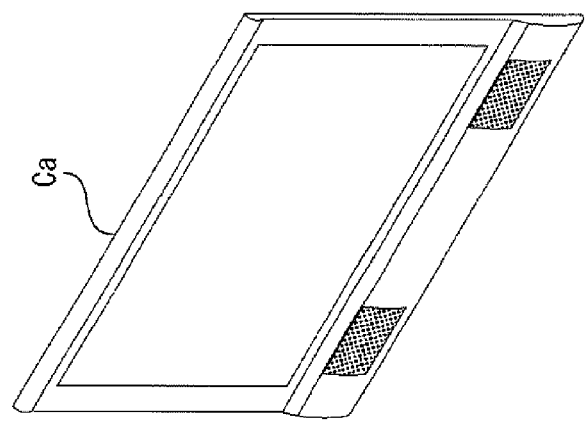
FIG.1

LIGHTING DEVICE, DISPLAY DEVICE AND TELEVISION RECEIVER

This application is the U.S. national phase of International Application No. PCT/JP2008/060143 filed 2 Jun. 2008, which designated the U.S. and claims priority to JP Application No.2007-272697 filed 19 Oct. 2007, the entire contents of each of which are hereby incorporated by reference.

TECHNICAL FIELD

The present invention relates to a lighting device, a display device and a television receiver.

BACKGROUND ART

In a display device using non-light emitting optical components, such as a liquid crystal display device, a backlight unit is provided behind a display panel such as a liquid crystal display panel for illuminating the display panel. Many backlight units of such a kind includes a plurality of elongated straight tube type lamps as light sources. Such backlight units generally include a plurality of the lamps and light emitted from the lamps is equalized by diffuser plates.

Due to a recent increasing demand for reductions in thickness and power consumption, problems to be solved for the backlight units are becoming clear. For example, the lamps and are closely arranged to diffuser plates to reduce the thickness of the backlight units. As a result, brightness becomes uneven or uneven luminance distribution may occur due to shadows of the lamps.

Patent Document 1 discloses a backlight unit as means for making luminance distribution uniform. It includes a reflector and a light transmissive diffuser plate that face each other via fluorescent lamps. The reflector has a band-like specular reflection section that mainly provides specular reflection in a part that is off the fluorescent lamps, that is, does not directly face the fluorescent lamps. The other part of the reflector is a diffuse reflection section that mainly provides diffuse reflection. According to the backlight unit, light rays specularly reflected off the specular reflection section converge at a middle point between the fluorescent lamps. Therefore, an decrease in brightness at that point is complemented and thus the luminance distribution becomes uniform.

Patent Document 2 discloses an apparatus including a plurality of straight tube lamps arranged substantially in parallel along longitudinal right and left sides of a display screen of a display panel. Moreover, they are arranged at a small interval in an area corresponding to a central area of the display screen of the display panel. The interval becomes larger with a constant pitch toward an upper end area and a lower end area of the display screen this arrangement may be referred to as an irregular lamp pitch). The apparatus is made focusing on a fact that human eyes tend to rest on around the center of screen and thus a light difference in brightness between edges and the center of the screen, that is, the edges is slightly darker than the center, is not noticeable. Based on that fact, the number of the lamps can be reduced while the uniformity of the luminance distribution is maintained. This produces power saving effects.

Patent Document 1: Japanese Unexamined Patent Publication No. 2004-354533

Patent Document 2: Japanese Patent Publication No. 3642723

(Problem to be Solved by the Invention)

The above documents, however, do not disclose adequate solutions for making the luminance distribution uniform in large screen liquid crystal display devices. Thus, farther technology development is urgently needed. Especially, the irregular lamp pitch disclosed in Patent Document 2 may experience uneven brightness or display unevenness because a correlation between the lamp arrangement and the overall screen brightness is very sensitive. At the edges of the screen, the amount of light is not sufficient because the interval between the lamps is large resulting in the brightness unevenness, or the light is not sufficiently reflected and shadows of the lamps may appear on the screen resulting in the display unevenness.

DISCLOSURE OF THE PRESENT INVENTION

The present invention was made in view of the foregoing circumstances. An object of the present invention is to provide a lighting device that is capable of tempering an illumination brightness distribution by partially adjusting the illumination brightness with a simple configuration. Another object of the present invention is to provide a television receiver having such a display device.

(Means for Solving the Problem)

To solve the above problem, a lighting device of the present invention includes a plurality of tubular light sources provided in a parallel arrangement and a light reflecting member disposed on a side opposite from an illuminating side that is illuminated with light from the tubular light sources. The parallel arrangement of the tubular light sources includes a narrow pitch area in which an interval between the tubular light sources is relatively small and a wide pitch area in which an interval between the tubular light sources is relatively large. The light reflecting member includes a dot pattern in which a plurality of dots is arranged. The dots have light reflectivity different from that of the light reflecting member. Light reflectivity of a light reflecting surface including surfaces of the light reflecting member and the dot pattern is lower in the narrow pitch area than in the wide pitch area.

According to such a lighting device, the illumination brightness in the narrow pitch area is relatively higher than in the wide pitch area because the interval of the tubular light source arrangement is relatively small in the narrow pitch area and it is relatively large in the wide pitch area. Furthermore, the number of the tubular light sources is reduced in the wide pitch area by setting the interval relatively large. This contributes to a cost reduction.

Some lighting devices may be expected to provide illumination with high luminance in a part and with low luminance in the other part depending on application. A display device using the lighting device of the present invention for display, for example, does not require relatively high brightness in outer areas (edge areas) of the display screen but requires relatively high brightness in an inner area (central area) of the display screen. Therefore, providing the wide pitch area in the outer areas and the narrow pitch area in the inner area is preferable.

When arranging the tubular light sources at different intervals, an arrangement balance between the narrow pitch area where the illumination brightness is relatively high and the wide pitch area where the illumination brightness is relatively low is important. If the difference in the illumination brightness between the narrow pitch area and the wide pitch area is significantly large, an overall illumination brightness distribution becomes uneven. As a result, the display device using the lighting device may have brightness unevenness.

In addition to the above configuration in which the tubular light sources arranged at different intervals, the present invention provides the configuration in which the dots having the different light reflectivity from that of the light reflecting member are arranged on the light reflecting member. Further in this configuration, the light reflectivity of the light reflecting surface including the surfaces of the light reflecting member and the dots is lower in the small pitch area of the tubular light source arrangement than in the wide pitch area. With this configuration, the overall illumination brightness distribution of the lighting device can be tempered.

Some rays of the light emitted from the tubular light sources travel directly toward the illuminating side (e.g., the display panel side). Some rays of the light travel in directions other than the illuminating side. Those rays of the light reflect off the light reflecting member and travel toward the illuminating side. The illumination brightness is defined based on a total amount of these rays of the light.

By providing the dots having the light reflectivity different from that of the light reflecting member, the light reflectivity can be adjusted in part by part of the light reflecting member. As a result, the illumination brightness can be adjusted. Specifically, the light reflectivity is set relatively low in the narrow pitch area where the illumination brightness tends to be relatively high, and it is set relatively high in the wide pitch area where the illumination brightness tends to be relatively low. With this configuration, the difference in the illumination brightness between the narrow pitch area and the wide pitch area can be adjusted. As a result, the overall illumination brightness distribution of the lighting device can be tempered and thus display unevenness including the brightness unevenness of the display device using the lighting device can be compensated or eased.

BRIEF DESCRIPTION OF THE DRAWINGS

[FIG. 1] is an exploded perspective view illustrating a general construction of a television receiver according to the first embodiment of the present invention;

BEST MODE FOR CARRYING OUT THE INVENTION

<First Embodiment>

The first embodiment of the present invention will be explained with reference to FIGS. 1 to 5. In this embodiment, a television receiver TV including a liquid crystal display device 10 will be explained.

Figure 2:
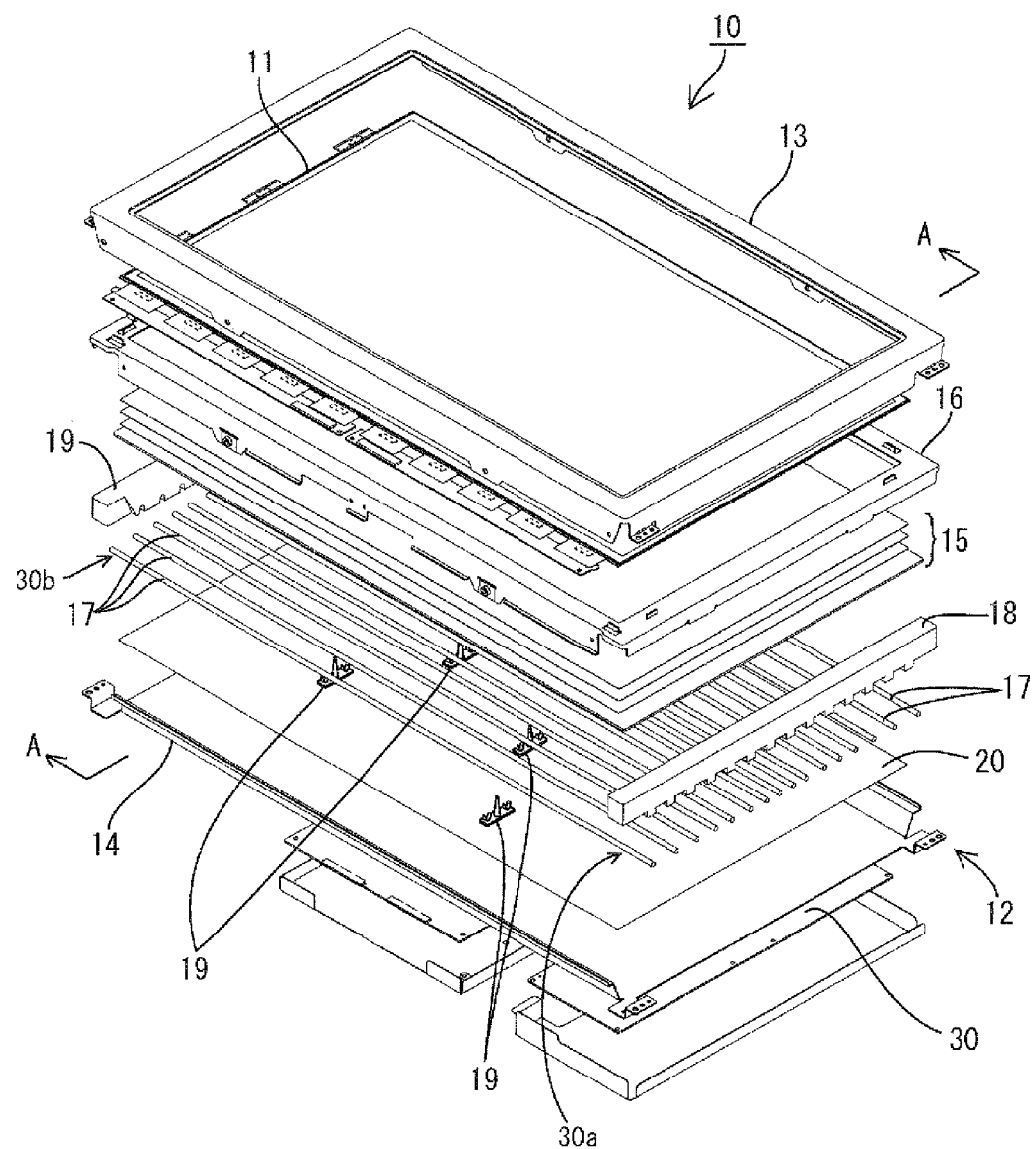
[FIG. 2] is an exploded perspective view illustrating a general construction of a liquid crystal display device included in the television receiver in FIG. 1.
Figure 3:
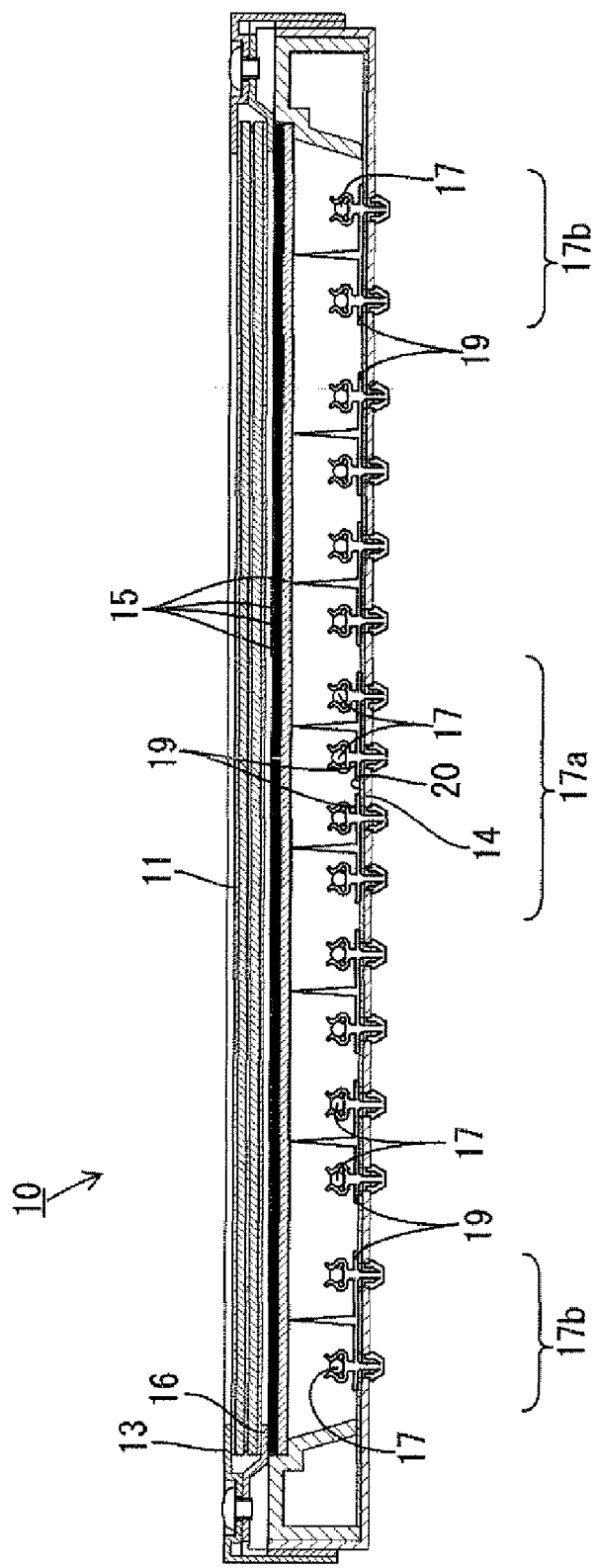
[FIG. 3] is a cross-sectional view of the liquid crystal display device in FIG. 2 along the line A-A.
Figure 4:
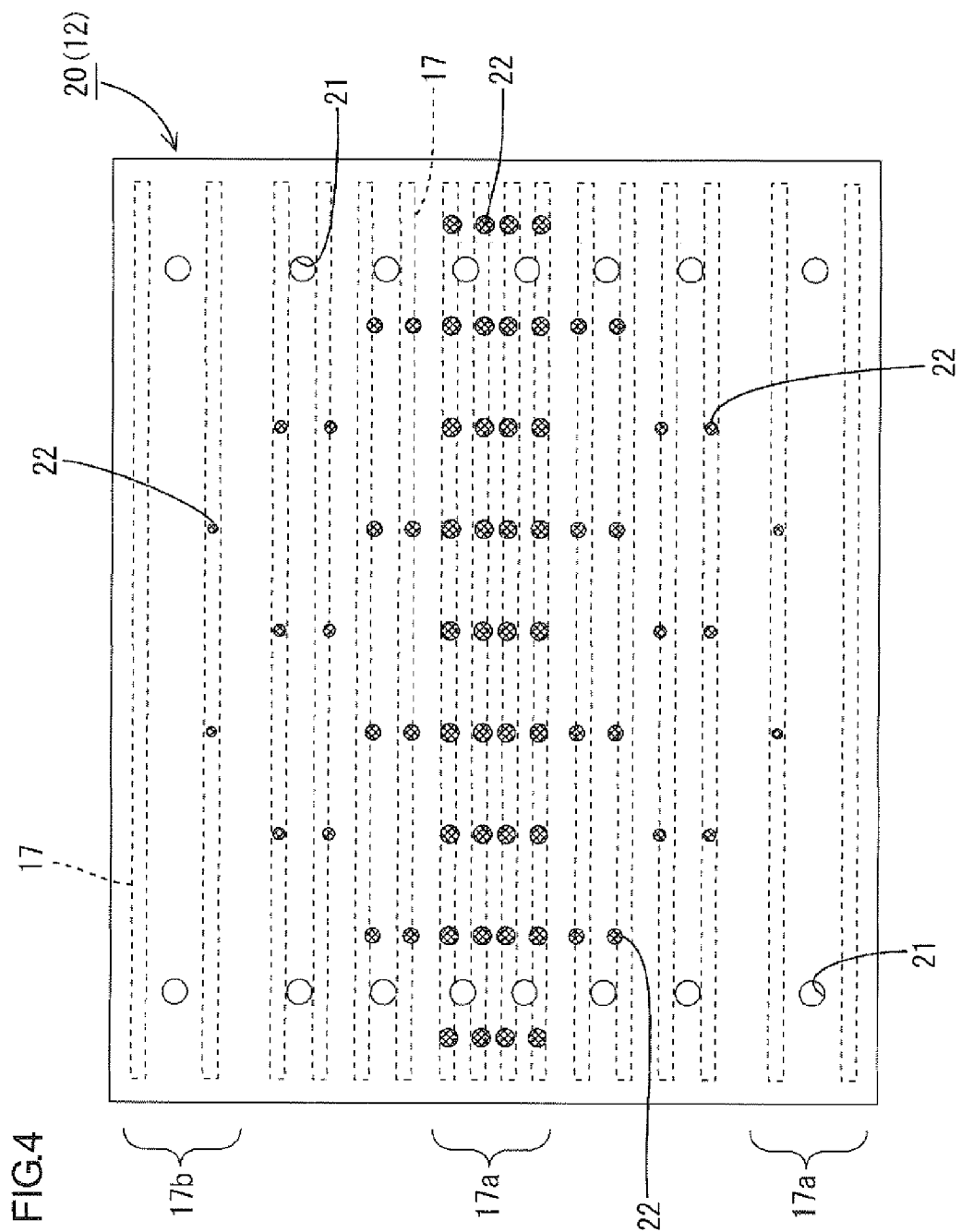
[FIG. 4] is a schematic plan view illustrating a construction of a light reflecting sheet arranged in the liquid crystal display device in FIG. 2.
Figure 5:
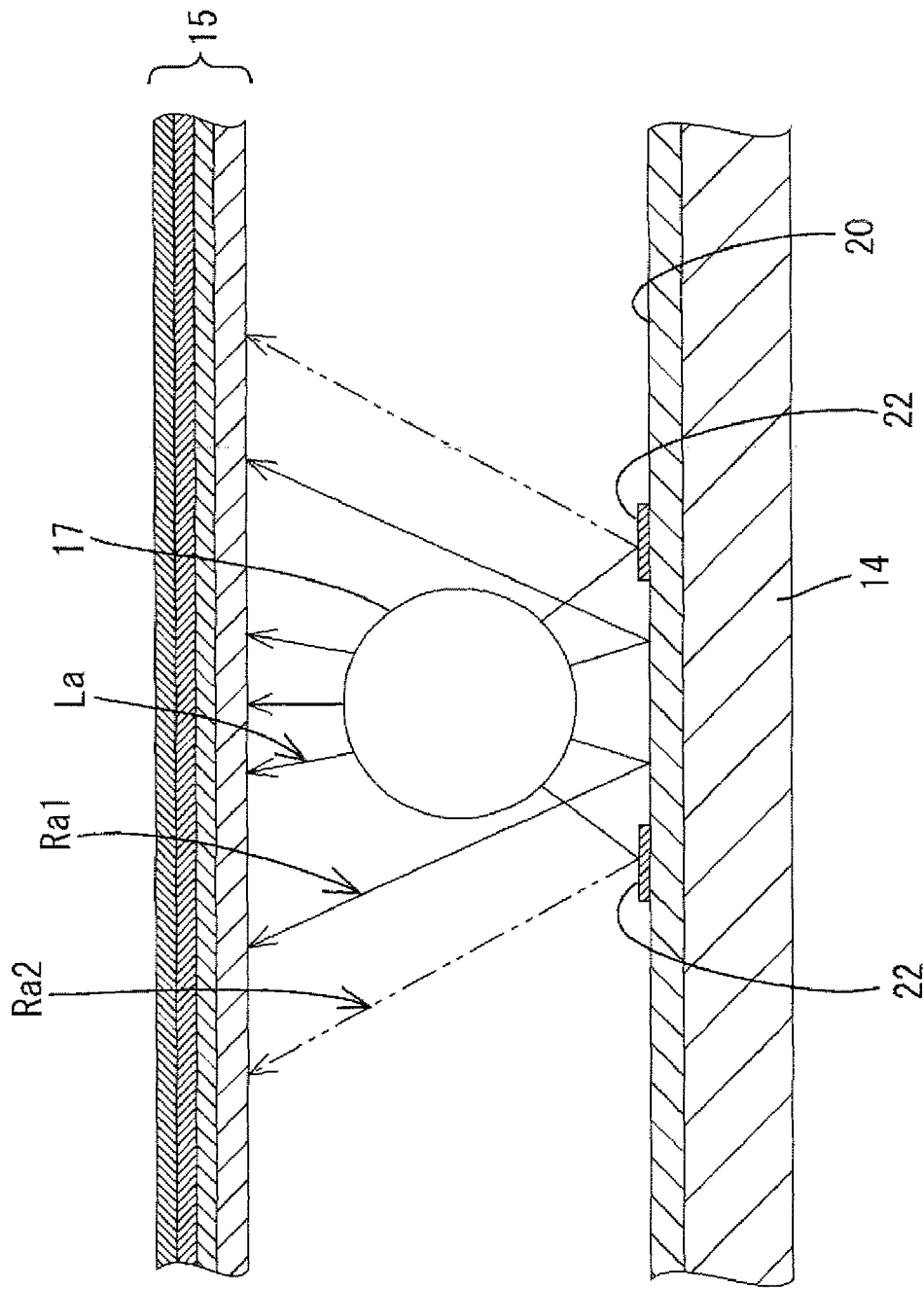
[FIG. 5] is an explanatory view schematically illustrating operational effects of the light reflecting sheet in FIG. 4.

FIG. 1 is an exploded perspective view illustrating a general construction of the television receiver of this embodiment. FIG. 2 an exploded perspective view illustrating a general construction of the liquid crystal display device. FIG. 3 is a cross-sectional view of the liquid crystal display device along the line A-A. FIG. 4 is a schematic plan view illustrating a construction of a light reflecting sheet arranged in the liquid crystal display device. FIG. 5 is an explanatory view schematically illustrating operational effects of the light reflecting sheet.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position such that a short-side direction thereof matches a vertical direction. As illustrated in FIG. 2, it includes a liquid crystal panel 11, which is a display panel, and a backlight device 12, which is an external light source. They are integrally held by a bezel 13 and the like.

Next, the liquid crystal panel 11 and the backlight device 12 included in the liquid crystal display device 10 will be explained (see FIGS. 2 and 3).

The liquid crystal panel (display panel) 11 is configured such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other and pixel electrodes connected to the switching components are provided. On the other substrate, counter electrodes, color filter having color sections such as R, G and B color sections arranged in a predetermined pattern and the like are provided.

The backlight device (lighting device) 12 is a so-called direct backlight device in which a light source is arranged closely behind a panel surface (i.e., a display surface) of the liquid crystal panel 11. It includes a plurality of tubular light sources (cold cathode tubes (light sources) 17 are used as high-pressure discharge tubes here) along the panel surface.

The backlight device 12 further includes a chassis 14, a plurality of optical members 15 (a diffuser plate, a diffusing sheet, a lens sheet and a reflection type polarizing plate, arranged in this order from the lower side of the drawings) and a frame 16. The chassis 14 has a substantially box-shape and an opening on the top. The optical members 15 are arranged so as to cover the opening of the backlight chassis 14. The frame 16 holds the optical members 15 to the backlight chassis 14. The cold cathode tubes 17, lamp holders 18 that cover ends of the cold cathode tubes 17 collectively, and lamp clips 19 for mounting the cold cathode tubes 17 to the chassis 14 are installed in the chassis 14. A light emitting side of the backlight device 12 is a side closer to the optical member 15 than the cold cathode tube 17.

Each cold cathode tube 17 has an elongated tubular shape. A plurality of them (sixteen tubes in FIG. 2) are housed in the chassis 14 such that the longitudinal direction (i.e., the axial direction) thereof matches the longitudinal direction of the chassis 14. As illustrated in FIG. 3, the cold cathode tubes 17 are arranged at a relatively small interval in a narrow pitch area 17a located in a central area of the arrangement (i.e., a central area of the backlight device 12). They are arranged at a relatively large interval in wide pitch areas 17b located in end areas of the arrangement (i.e., end areas of the backlight device 12). More specifically, the interval between the adjacent cold cathode tubes 17 gradually becomes larger along from the central area of the backlight device 12 in the short-side direction toward the end areas.

The chassis 14 is constructed of metal plates. A light reflecting sheet (light reflecting member) 20 is disposed on a side opposite from the illuminating side that is illuminated with light from the cold cathode tubes 17 so as to form a light reflecting surface. With this chassis 14 including the light reflecting sheet 20, light emitted from the cold cathode tubes 17 is reflected toward the optical members 15 including the diffuser plate.

An inverter board 30 for supplying driving power to the cold cathode tubes 17 is mounted on the chassis 14 on a side opposite from the side on which the cold cathode tubes 17 are arranged (i.e., a side opposite from the illuminating side). More specifically, the inverter board 30 is mounted on only one of the longitudinal end side of the chassis 14 and the driving power is supplied from the inverter board 30 to one end of each cold cathode tube 17. The inverter board 30 includes an inverter circuit that generates a high frequency voltage to turn on the cold cathode tubes 17.

The light reflecting sheet 20 is a resin sheet having light reflectivity that is higher than the chassis 14. The light reflecting sheet 20 is arranged parallel to a plane on which the cold cathode tubes 17 arranged in parallel. As illustrated in FIG. 4, a central area of the eight reflecting sheet 20 around the middle of the short side thereof corresponds to the narrow pitch area 17a of the arrangement of the cold cathode tubes 17. End areas of the light reflecting sheet 30 around the short-side ends thereof correspond to in the wide pitch areas 17b of the arrangement of the cold cathode tubes 17.

The light reflecting sheet 20 has mounting holes 21 for mounting the lamp clips 19 in the surface that faces the cold cathode tubes 17. Moreover, a dot pattern including a plurality of black dots 22 is formed on that surface. The dots 22 are formed by printing paste of carbon, zinc, titanium oxide and the like on the surface of the light reflecting sheet 20. Inkjet printing, gravure printing and the like are preferable as printing means.

As illustrated in FIG. 4, the dots 22 are formed in line along the longitudinal direction of the light reflecting sheet 20 (i.e., the axial direction of the cold cathode tubes 17). The dots 22 form a plurality of lines (fourteen lines in FIG. 4) in a parallel arrangement along the short side direction of the light reflecting sheet 20 (i.e., the parallel arrangement direction of the cold cathode tubes 17).

An area (a size) of each dot 22 in each line located in an area of the light reflecting sheet 20 corresponding to the narrow pitch area 17a (the central area around the middle of the short side) is relatively large. On the other hand, an area of each dot 22 in each line located in areas of the light reflecting sheet 20 corresponding to the wide pitch areas 17b (the end areas around the short-side ends) is relatively small. The areas of dots 22 gradually become smaller along from the narrow pitch area 17a toward the wide pitch areas 17b.

Intervals between the dots 22 adjacent to each other in the axial direction of the cold cathode tubes 17 in each line are the same.

Intervals between the dots 22 adjacent to each other in the axial direction of the cold cathode tubes 17 are relatively small in the lines located in the area of the light reflecting sheet 20 corresponding to the narrow pitch area 17a and thus the dots 22 are formed closely. Intervals between the dots 22 adjacent to each other in the axial direction of the cold cathode tubes 17 are relatively large in the lines located in the area of the light reflecting sheet 20 corresponding to the wide pitch areas 17b and thus the dots 22 are formed sparsely. The intervals gradually become larger along from the narrow pitch area 17a toward the wide pitch areas 17b.

Intervals between the dots 22 adjacent to each other in the parallel arrangement direction of the cold cathode tubes 17 are relatively small in the lines located in the area of the light reflecting sheet 20 corresponding to the narrow pitch area 17a and thus the dots 22 are formed closely. Intervals between the dots 22 adjacent to each other in the parallel arrangement direction of the cold cathode tubes 17 are relatively large in the lines located in the area of the light reflecting sheet 20 corresponding to the wide pitch areas 17b and thus the dots 22 are formed sparsely. The intervals gradually become larger along from the narrow pitch area 17a toward the wide pitch areas 17b.

As described above, the areas of the dots 22 become smaller and the intervals between the dots 22 become larger along from the narrow pitch area 17a of the cold cathode tubes 17 arrangement toward, the wide pitch areas 17b. Therefore, a dot pattern occupancy that is a percentage of a total area of the dots 22 over a total area of the light reflecting sheet 20 is larger in the narrow pitch area 17a than in the wide pitch areas 17b.

Measurements of the light reflectivity of the dots 22 and the light reflecting sheet 20 are shown in table 1. In table 1, the Light reflectivity column provides the light reflectivity specific to the light reflecting sheet 20 or the dots 22. The dot pattern occupancy column provides a percentage of a total area of the dots 22 over a total area of the light reflecting sheet 20. The average light reflectivity column provides an average of actual measurements of the light reflectivity on the optical member side in a case that the dot patterns are formed on the light reflecting sheet 20 based on the dot pattern occupancy. Measurements of gray dots are also provided as a reference.
<Table 1>

As shown in table 1, the light reflectivity of the black dots 22 is about 1/15 of the light reflectivity of the light reflecting sheet 20. This indicates that the amount of reflected light can be significantly reduced by printing the black dots 22 on the light reflecting sheet 20. By increasing the dot pattern occupancy of the black dots 22 from 1.4% to 8.5%, the average light reflectivity decreases by 6.5%. This confirms that the dot pattern occupancy functions as a means for adjusting the amount of reflected light.

By providing the light reflecting sheet 20, on which dots 22 are printed, on the chassis 14, light emitted from the cold cathode tubes 17 enters the optical members 15 as illustrated in FIG. 5. The incident light entering the optical members 15 is a sum of light La that enters directly from the cold cathode tubes 17, light Ra1 reflected by the light reflecting sheet 20 and light Ra2 reflected by the black dots 22. Because the light reflectivity of the black dots 22 is significantly small, which is about 1/15 of the light reflectivity of the light reflecting sheet 20, the amount of the light Ra1 is larger than that of the light Ra2. Therefore, the light reflectivity of the light reflecting sheet 20 in areas where the dots 22 are formed is reduced.

The light reflectivity of the light reflecting surface including the surfaces of the light reflecting sheet 20 and the dot pattern is smaller in the narrow pitch area 17a where the dot pattern occupancy is relatively high than in the wide pitch areas 17b where the dot pattern occupancy is relatively low.

According to the television receiver TV of the present embodiment with the above configuration, the following operational effects are achieved.

In the backlight device 12 included in the television receiver TV of the present embodiment, the cold cathode tubes 17 are arranged at the relatively small interval in the narrow pitch area 17a and at the relatively large interval in the wide pitch areas 17b. The narrow pitch area 17a is located in the central area of the backlight device 12 and the wide pitch areas 17b are located in the end areas of the backlight device 12.

With this configuration, illumination brightness in the narrow pitch area 17a is relatively higher than in the wide pitch areas 17b. Therefore, visibility in the central area of the screen of the liquid crystal display device 10 improves. Furthermore, the number of the cold cathode tubes 17 is reduced by providing the wide pitch area 17b and thus a cost reduction can be expected.

On the other hand, an adjustment of arrangement balance between the narrow pitch area 17a where the illumination brightness is relatively high and the wide pitch areas 17b where it is relatively low is very difficult. If a difference in the illumination brightness between the narrow pitch area 17a and the wide pitch area 17b becomes large, an overall illumination brightness becomes uneven. As a result, brightness unevenness occurs in the liquid crystal display device 10.

This embodiment further provides means for adjusting the illumination brightness. The dot pattern including the dots 22 having the different light reflectivity from that of the light reflecting sheet is formed on the light reflecting sheet 20. The light reflectivity of the light reflecting surface including the dot pattern and the light reflecting sheet 20 is higher in the narrow pitch areas 17a than in the wide pitch areas 17b.

With this configuration, the light emitted from the cold cathode tubes 17 is reflected by either the light reflecting sheet 20 or the dots 22. Namely, the light reflectivity of the light reflecting sheet 20 can be adjusted area by area and thus the illumination brightness can be adjusted. The light reflectivity of the light reflecting surface in the narrow pitch area 17a where the illumination brightness tends to increase is adjusted to a relatively low level. On the other hand, the light reflectivity of the light reflecting surface in the wide pitch areas 17b where the illumination brightness tends to decrease is adjusted to a relatively high level. With this configuration, the difference in the illumination brightness between the narrow pitch area 17a and the wide pitch areas 17b can be adjusted. As a result, the backlight device 12 has a relatively flat illumination brightness distribution and thus the brightness unevenness or the display unevenness can be compensated or eased.

In this embodiment, the light reflectivity of the dots 22 is lower than that of the light reflecting sheet 20. The dot pattern including the dots 22 has the dot pattern occupancy higher in the narrow pitch area 17a than in the wide pitch areas 17b.

Because the light reflectivity of the dots 22 is lower than that of the light reflecting sheet 20, the amount of light reflected by the light reflecting surface including the light reflecting sheet 20 and the dot pattern is smaller in the area having the lower dot pattern occupancy. Namely, the amount of the reflected light is relatively small in the narrow pitch area 17a and relatively large in the wide pitch areas 17b. Therefore, the amount of the reflected light is small in the narrow pitch area 17a where the illumination brightness tends to become relatively high, and it is large in the wide pitch areas 17b where the illumination brightness tends to become relatively low. With this complementary relationship, the backlight device 12 can provide the relatively flat illumination brightness distribution.

In this embodiment, the dots 22 are provided in black.

By forming the dots 22 in black that is less likely to reflect light, the light reflectivity of the dots 22 can be reduced. Therefore, the difference in the light reflectivity between the dots 22 and the light reflecting sheet 20 becomes large and thus a function for adjusting the amount of the reflected light with the dot pattern can be enhanced.

In this embodiment, the intervals between the dots 22 adjacent to each other in the axial direction of the cold cathode tubes 17 are smaller in the narrow pitch area 17a than in the wide pitch areas 17b.

Further, the intervals between the dots 22 adjacent to each other in the parallel arrangement direction of the cold cathode tubes 17 are smaller in the narrow pitch area 17a than in the wide pitch areas 17b.

Still further, the area of each dot 22 in the narrow pitch area 17a is larger than that of each dot 22 in the wide pitch areas 17b.

With this configuration, the dot pattern occupancy in the narrow pitch area 17a is higher than that in the wide pitch areas 17b. The light reflectivity of the dots 22 is lower than that of the light reflecting sheet 20. Thus, the amount of the reflected light is relatively small in the narrow pitch area 17a where the dot pattern occupancy is relatively large. As a result, the illumination brightness decreases in the narrow pitch area 17a and thus the difference in the brightness between the narrow pitch area 17a and the wide pitch areas 17b decreases.

In this embodiment, a plurality of dots 22 provided in a parallel arrangement form the dot pattern.

In this configuration, the dots are provided in a regular arrangement and thus an accuracy of the adjustment of the amount reflected light can be improved.

In this embodiment, the dot pattern is formed by printing on the light reflecting sheet 20.

With such a simple means, the dot pattern can be designed as appropriate and easily formed as designed.

<Second Embodiment>

Next, the second embodiment of the present invention will be explained with reference to FIG. 6. In the first embodiment, the dots 22 are formed according to only the difference in the illumination brightness between the narrow pitch area 17a and the wide pitch areas 17b. In the present embodiment, the dots are formed according further to a difference in the illumination brightness created by voltage differences among the cold cathode tubes 17. Other configurations are the same as the first embodiments. The same parts as those in the previous embodiment are indicated by the same symbols and will not be explained.

Figure 6:
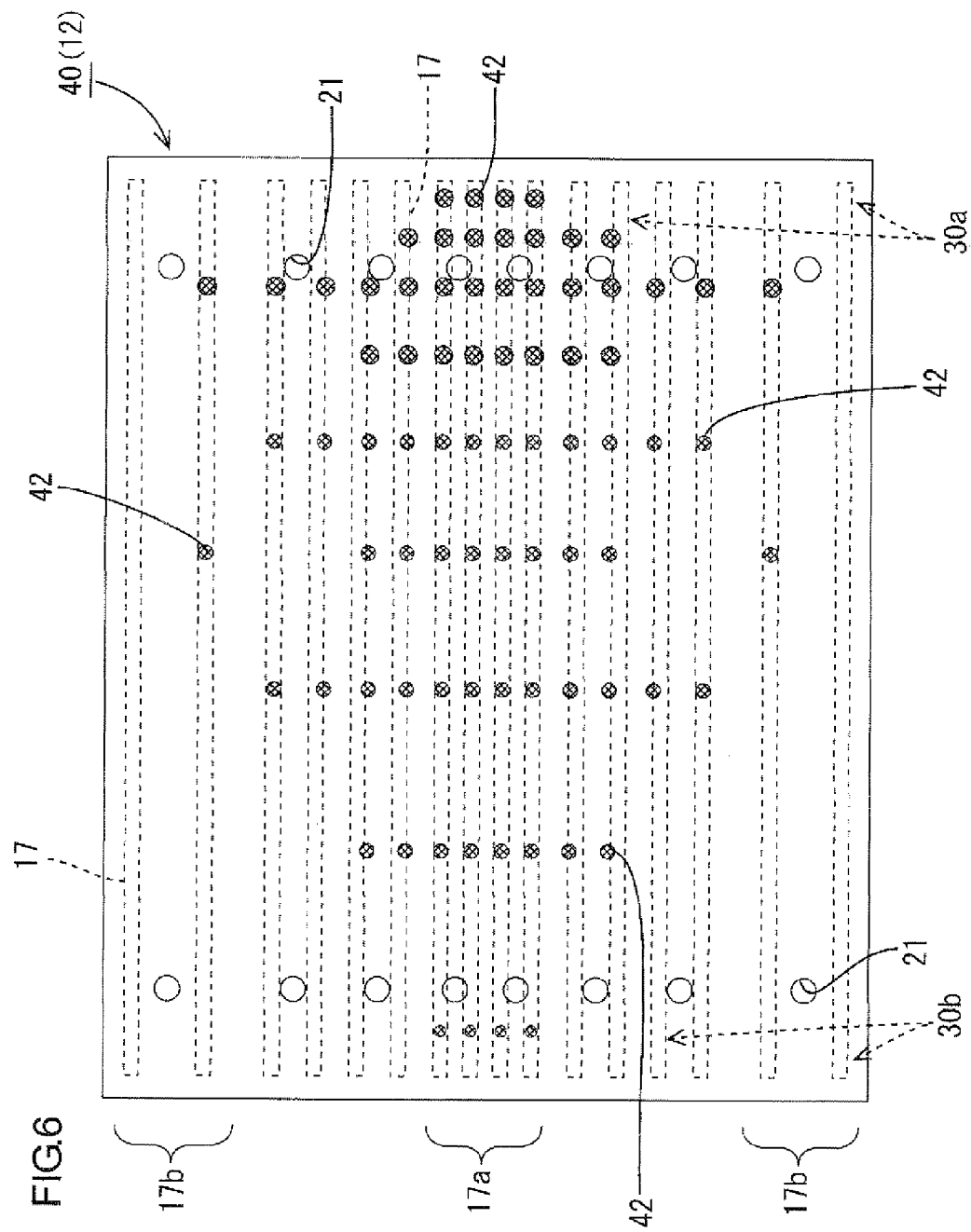
[FIG. 6] is a schematic plan view illustrating a construction of a light reflecting sheet arranged in a backlight device according to the second embodiment of the present invention.

FIG. 6 is a schematic plan view illustrating a construction of a light reflecting sheet arranged in a liquid crystal display device of the present embodiment.

The inverter board 30 that supplies the driving power to the cold cathode tubes 17 arranged in the backlight device 12 is mounted on only one of the longitudinal end side of the chassis 14 (see FIG. 2 provided for the first embodiment). Therefore, the driving power is fed from the inverter board 30 to one end of each cold cathode tube 17. A voltage at the end of each cold cathode tube 17 to which the driving power is fed (high voltage section 30a) is high while a voltage at the other end (low voltage section 30b) is low.

A light reflecting sheet 40 is arranged parallel to a plane on which the cold cathode tubes 17 are arranged in parallel. As illustrated in FIG. 6, one of longitudinal end areas of the light reflecting sheet 40 (on the right side in FIG. 6) faces the high voltage sections 30a of the cold cathode tubes 17. The other longitudinal end area of the light reflecting sheet 40 (on the left side in FIG. 6) faces the low voltage sections 30b. A dot pattern including a plurality of black dots 42 is printed on the light reflecting sheet 40.

The dots 42 are arranged in line along the longitudinal direction of the light reflecting sheet 40 (i.e., the axial direction of the cold cathode tubes 17). The dots 42 form a plurality of lines (fourteen lines in FIG. 6) in a parallel arrangement along the short-side direction of the light reflecting sheet 40 (i.e., the parallel arrangement direction of the cold cathode tubes 17).

An area (a size) of each dot 42 in each line located in the area facing the high voltage sections 30a of the cold cathode tubes 17 (on the right end side of the light reflecting sheet 40 in FIG. 6) is relatively large. On the other hand, an area of each dot 42 in each line located in the area facing the low voltage sections 30b of the cold cathode tubes 17 (on the left end side of the light reflecting sheet 40 in FIG. 6) is relatively small. The areas of dots 42 gradually become smaller along from the area facing the high voltage sections 30a toward the areas facing the low voltage sections 30b.

Intervals between the dots 42 adjacent to each other in the axial direction of the cold cathode tubes 17 are relatively small in the lines located in the area facing the high voltage sections 30a of the cold cathode tubes 17 and thus the dots 42 are arranged closely. Intervals between the dots 42 adjacent to each other in the axial direction of the cold cathode tubes 17 are relatively large in the lines located in the area facing the low voltage sections 30b of the cold cathode tubes 17 and thus the dots 42 are formed sparsely. The intervals gradually become larger along from the area facing the high voltage sections 30a toward the area facing the low voltage sections 30b.

The areas of the dots 42 become smaller and the intervals between the dots 42 become larger along from the area facing the high voltage sections 30a of the cold cathode tube 17 toward the area facing the low voltage sections 30b. Therefore, the dot pattern occupancy of the dots 42 is higher in the area facing the high voltage sections 30a than in the area facing the low voltage sections 30b.

The arrangements of the dots 42 in the narrow pitch area 17a and the wide pitch areas 17b are the same as the first embodiment. Namely, the intervals between the dots 42 are smaller in the narrow pitch area 17a than in the wide pitch areas 17b. With this configuration, the dot pattern occupancy of the dots 42 is high in the narrow pitch area 17a than in the wide pitch areas 17b.

According to the backlight device 12 of this embodiment, the dots 42 are arranged so that the dot pattern occupancy that is a percentage of the total area of the dots 42 over the total area of the light reflecting sheet 40 is higher in the area facing the high voltage sections 30a of the cold cathode tubes 17 than in the area facing the low voltage sections 30b.

The unevenness of the illumination brightness of the backlight device 12 is created by not only the arrangement balance between the narrow pitch area 17a and the wide pitch areas 17b but the voltage differences of the cold cathode tubes 17. Namely, the luminance of the cold cathode tubes 17 may be higher at the high voltage sections 30a than at the low voltage sections 30b.

To compensate for the problem, the dots 42 having the lower light reflectivity than the light reflecting sheet 40 are formed such that the dot pattern occupancy is higher in the area facing the high voltage sections 30a than in the area facing the low voltage sections 30b. With this configuration, the amount of the reflected light in the area facing the high voltage sections 30a is relatively small and thus the illumination brightness decreases. As a result, the difference in the illumination brightness between the area facing the high voltage sections 30a and the area facing the low voltage sections 30b decreases.

In this embodiment, the dots 42 are formed such that the intervals between the dots 42 adjacent to each other in the axial direction of the cold cathode tubes 17 is smaller in the area facing the high voltage sections 30a than in the area facing the low voltage sections 30b.

Further, the dots 42 are formed such that the intervals between the dots 42 adjacent to each other in the parallel arrangement direction of the cold cathode tubes 17 is smaller in the area facing the high voltage sections 30a than in the area facing the low voltage sections 30b.

Still further, the dots 42 in the area facing the high voltage sections 30a have the areas larger than those in the area facing the low voltage sections 30b.

With this configuration, the dot pattern occupancy is higher in the area facing the high voltage sections 30a than in the area facing the low voltage sections 30b. The dots 42 have the light reflectivity lower than the light reflecting sheet 40. Namely, the amount of the reflected light is relatively small in the area facing the high voltage sections 30a where the dot pattern occupancy is relatively high, and the illumination brightness decreases. Therefore, the difference in the brightness in the areas facing the high voltage sections 30a and the low voltage sections 30b decreases.

<Third Embodiment>

Next, the third embodiment of the present invention will be explained with reference to FIGS. 7 and 8. In the first embodiment, the dots having the light reflectivity lower than the light reflecting sheet are provided. In this embodiment, dots having the light reflectivity higher than a light reflecting sheet are provided. Other configurations are the same as the first embodiments. The same parts as those in the previous embodiment are indicated by the same symbols and will not be explained.

Figure 7:
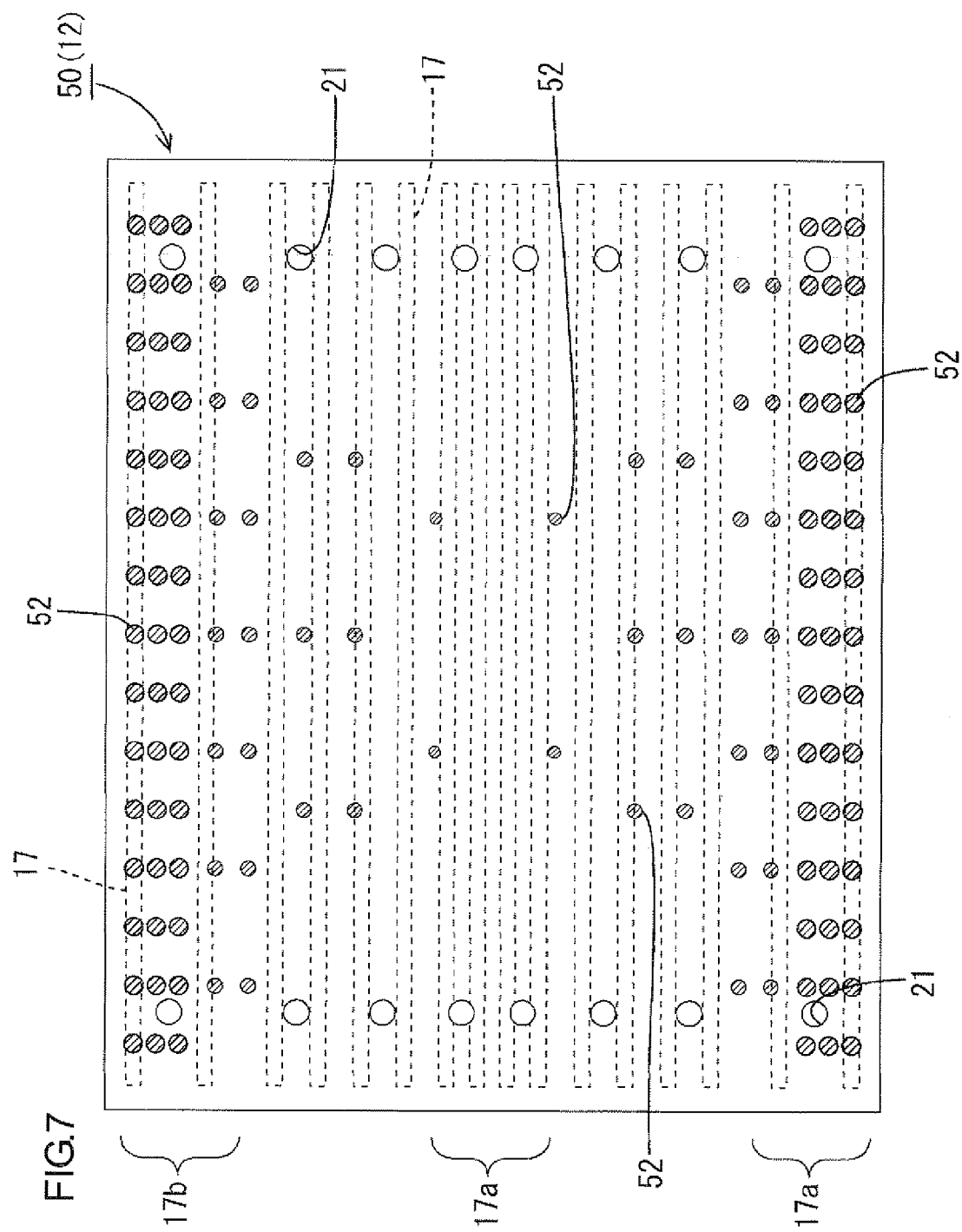
[FIG. 7] is a schematic plan view illustrating a construction of a light reflecting sheet arranged in a backlight device according to the third embodiment.

FIG. 7 is a schematic plan view illustrating a construction of a light reflecting sheet arranged in a backlight device of this embodiment. FIG. 8 is an explanatory view schematically illustrating operational effects of the light reflecting sheet.

A light reflecting sheet 50 included in the backlight device 12 is arranged parallel to a plane on which the cold cathode tubes 17 are arranged in parallel. As illustrated in FIG. 7, a central area of the light reflecting sheet 50 around the middle of he short side thereof corresponds to the narrow pitch area 17a of the arrangement of the cold cathode tubes 17. Short-side end areas of the light reflecting sheet 50 face the wide pitch areas 17b of the arrangement of the cold cathode tubes 17. End areas of the light reflecting sheet 50 around the short-side ends thereof correspond to the wide pitch areas 17b of the arrangement of the cold cathode tubes 17.

Mounting holes 21 are formed in a surface of the light reflecting sheet 50 facing the cold cathode tubes 17. Moreover, a dot pattern including a plurality of white dots 52 is formed on that surface. The dots 52 are formed by applying paste containing a fluorescent whitening agent that is stilbene derivative, for example, to the surface of the light reflecting sheet 50. Inkjet printing, gravure printing and the like are preferable as printing means.

As illustrated in FIG. 7, a plurality of the dots 52 are arranged in line along the longitudinal direction of the light reflecting sheet 50 (i.e., the axial direction of the cold cathode tubes 17). The dots 52 form a plurality of lines (sixteen lines in FIG. 7) in a parallel arrangement along the short-side direction of the light reflecting sheet 50 (i.e., the parallel arrangement direction of the cold cathode tubes 17).

An area (a size) of each dot 52 in each line located in the area corresponding to the wide pitch areas 17b (the end areas around the short-side ends) of the light reflecting sheet 50 is relatively large. On the other hand, an area of each dot 52 in each line located in the area corresponding to the narrow pitch area 17a (the central area around the middle of the short side) of the light reflecting sheet 50 is relatively small. The areas of dots 52 gradually become smaller along from the wide pitch areas 17b toward the narrow pitch area 17a.

Intervals between the dots 52 adjacent to each other in the axial direction of the cold cathode tubes 17 are relatively small in the lines located in the area of the light reflecting sheet 50 corresponding to the wide pitch areas 17b and thus the dots 52 are formed closely. Intervals between the dots 52 adjacent to each other in the axial direction of the cold cathode tubes 17 are relatively large in the lines located in the area of the light reflecting sheet 50 corresponding to the narrow pitch area 17a and thus the dots 52 are formed sparsely. The intervals gradually become larger along from the wide pitch areas 17b toward the narrow pitch area 17a.

Intervals between the dots 52 adjacent to each other in the parallel arrangement direction of the cold cathode tubes 17 are relatively small in the lines located in the area of the light reflecting sheet 50 corresponding to the wide pitch areas 17b and thus the dots 52 are formed closely. Intervals between the dots 52 adjacent to each other in the parallel arrangement direction of the cold cathode tubes 17 are relatively large in the lines located in the area of the light reflecting sheet 50 corresponding to the narrow pitch area 17a and thus the dots 52 are formed sparsely. The intervals gradually become larger along from the wide pitch areas 17b toward the narrow pitch area 17a.

As described above, the areas of the dots 52 become smaller and the intervals between the dots 52 become larger along from the wide pitch areas 17b toward the narrow pitch area 17a. Therefore, a dot pattern occupancy that is a percentage of a total area of the dots 52 over a total area of the light reflecting sheet 50 is larger in the wide pitch areas 17b than in the narrow pitch area 17a.

Measurements of the light reflectivity of the dots 52 and the light reflecting sheet 50 are shown in table 2. In table 2, the light reflectivity and the average light reflectivity of the dots with the fluorescent whitening agent are measured by applying visible light and ultraviolet light to the dots 52.

<Table 2>

As shown in table 2, the light reflectivity of the dots 52 with the fluorescent whitening agent applied is larger than that of the light reflecting sheet 50. By printing the dots 52 with the fluorescent whitening agent on the light reflecting sheet 50, the amount of the reflected light can be increased.

Figure 8:
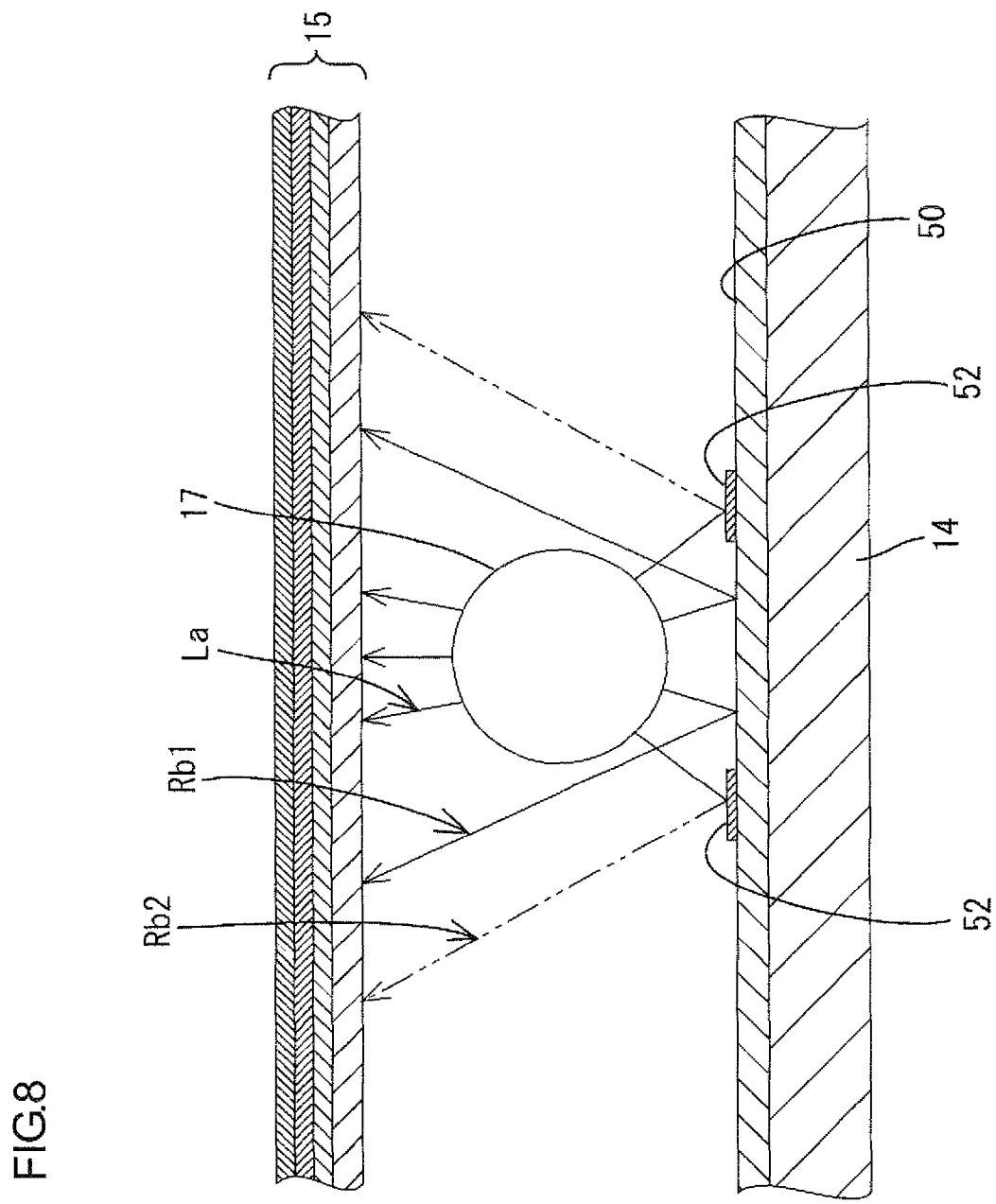
[FIG. 8] is an explanatory view schematically illustrating operational effects of the light reflecting sheet in FIG. 7.

By providing the light reflecting sheet 50, on which such dots 52 are printed, on the chassis 14, light emitted from the cold cathode tubes 17 enters the optical members 15 as illustrated in FIG. 8. The incident light entering the optical members 15 is a sum of light La that enters directly from the cold cathode tubes 17, light Rb1 reflected by the light reflecting sheet 50 and light Rb2 reflected by the dots 52. Because the light reflectivity of the dots 52 with the fluorescent whitening agent applied is higher than that of the light reflecting sheet 50, the amount of the light Rb2 is larger than that of the light Rb1. Therefore, the light reflectivity of the light reflecting sheet 50 in areas where the dots 52 are formed increases.

The light reflectivity of the light reflecting surface including the light reflecting sheet 50 and the dot pattern is lower in the narrow pitch area 17a where the dot pattern occupancy is relatively low than in the wide pitch areas 17b where the dot pattern occupancy is relatively high.

According to the backlight device 12 of this embodiment, the dots 52 having the light reflectivity higher than the light reflecting sheet 50 are formed on the light reflecting sheet 50. The dot pattern including the dots 52 is formed such that the dot pattern occupancy is larger in the wide pitch areas 17b than in the narrow pitch area 17a.

With this configuration, the amount of light reflected by the light reflecting surface including the light reflecting sheet 50 and the dot pattern is larger in the areas having the higher dot pattern occupancy. Namely, the amount of the reflected light is relatively small in the narrow pitch area 17a and relatively large in the wide pitch areas 17b. As a result, the amount of reflected light is small in the narrow pitch area 17a where the illumination brightness tends to be relatively high while it is large in the wide pitch areas 17b where the illumination brightness tends to be relatively low. With this complementary relationship, the backlight device 12 can provide a relatively flat illumination brightness distribution.

In this embodiment, the dots 52 are formed with the fluorescent whitening agent.

By forming the dots 52 with the fluorescent whitening agent that is more likely to reflect light, the light reflectivity of the dots 52 can be increased. Therefore, the difference in the light reflectivity between the dots 52 and the light reflecting sheet 50 becomes large and thus the function for adjusting the amount of reflected light with the dot pattern can be enhanced.

In this embodiment, the dots 52 are formed such that the intervals between the dots 52 adjacent to each other in the axial direction of the cold cathode tubes 17 are smaller in the wide pitch areas 17b than in the narrow pitch area 17a.

Further, the dots 52 are formed such that the intervals between the dots 52 adjacent to each other in the parallel arrangement direction of the cold cathode tubes 17 are smaller in the wide pitch areas 17b than in the narrow pitch area 17a.

Still further, the dots 52 in the wide pitch areas 17b have the larger area than those in the narrow pitch area 17a.

With this configuration, the dot pattern occupancy is higher in the wide pitch areas 17b than in the narrow pitch area 17a. The dots 52 have the light reflectivity higher than the light reflecting sheet 50. Namely, the amount of the reflected light is relatively large in the wide pitch areas 17b where the dot pattern occupancy is relatively high, and thus the illumination brightness increases. Therefore, the difference in the brightness between the wide pitch areas 17b and the narrow pitch area 17a decreases.

<Fourth Embodiment>

Next, the fourth embodiment of the present invention will be explained with reference to FIG. 9. In the third embodiment, the dots 52 having the higher light reflectivity than the light reflecting sheet 50 are arranged only based on the difference in the illumination brightness between the narrow pitch area 17a and the wide pitch areas 17b. In this embodiment, dots are arranged based on a difference in illumination brightness created by a voltage difference of the cold cathode tubes 17. Other configurations are the same as the third embodiments. The same parts as those in the third embodiment are indicated by the same symbols and will not be explained.

Figure 9:
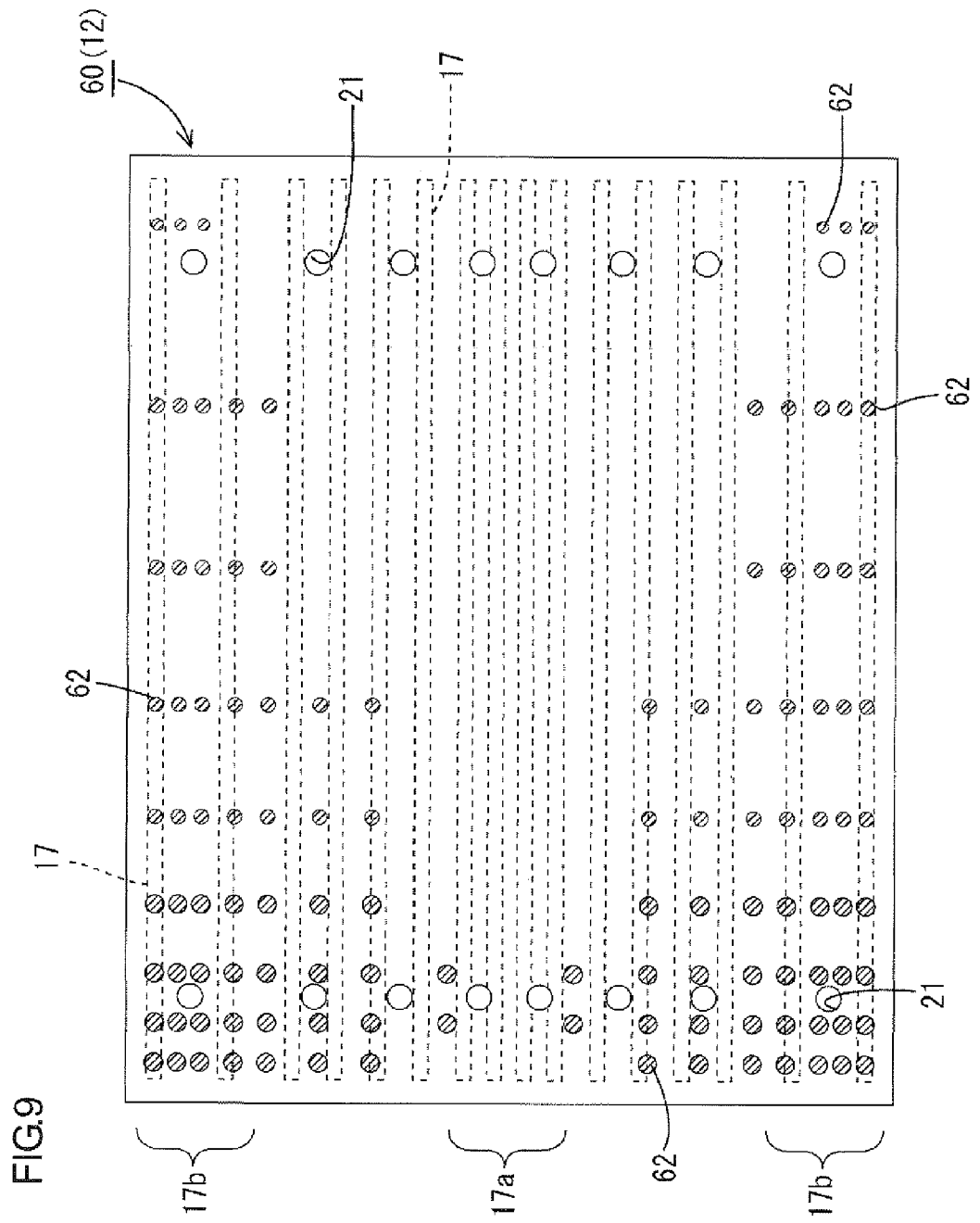
[FIG. 9] is a schematic plan view illustrating a construction of a light reflecting sheet arranged in a backlight device according to the fourth embodiment.

FIG. 9 is a schematic plan view illustrating a construction of a light reflecting sheet arranged in a backlight device of this embodiment.

The inverter board 30 that supplies the driving power to the cold cathode tubes 17 arranged in the backlight device 12 is mounted on only one of the longitudinal end side of the chassis (see FIG. 2 provided for the first embodiment). Therefore, the driving power is fed from the inverter board 30 to one end of each cold cathode tube 17. A voltage at the end of each cold cathode tube 17 to which the driving power is fed (high voltage section 30a) is high while a voltage at the other end (low voltage section 30b) is low.

A light reflecting sheet 60 is arranged parallel to a plane on which the cold cathode tubes 17 are arranged in parallel. As illustrated in FIG. 9, one of the longitudinal end areas of the light reflecting sheet 60 (on the right side in FIG. 9) faces the high voltage sections 30a of the cold cathode tubes 17. The other longitudinal end area of the light reflecting sheet 60 (on the left side in FIG. 9) faces the low voltage sections 30b. A dot pattern including a plurality of black dots 62 is printed on the light reflecting sheet 60.

The dots 62 are arranged in line along the longitudinal direction of the light reflecting sheet 60 (i.e., the axial direction of the cold cathode tubes 17). The dots 62 form a plurality of lines (sixteen lines in FIG. 9) in a parallel arrangement along the short-side direction of the light reflecting sheet 60 (i.e., the parallel arrangement direction of the cold cathode tubes 17).

An area (a size) of each dot 62 in each line located in the area facing the low voltage sections 30b of the cold cathode tubes 17 (on the left end side of the light reflecting sheet 60 in FIG. 9) is relatively large. On the other hand, an area of each dot 62 in each line located in the area facing the high voltage sections 30a of the cold cathode tubes 17 (on the right end side of the light reflecting sheet 60 in FIG. 9) is relatively small. The areas of the dots 62 gradually become smaller along from the area facing the low voltage sections 30b toward the area facing the high voltage sections 30a.

Intervals between the dots 62 adjacent to each other in the axial direction of the cold cathode tubes 17 are relatively small in the lines located in the area facing the low voltage sections 30b of the cold cathode tubes 17 and thus the dots 62 are arranged closely. Intervals between the dots 62 adjacent to each other in the axial direction of the cold cathode tubes 17 are relatively large in the lines located in the area facing the high voltage sections 30a of the cold cathode tubes 17 and thus the dots 62 are formed sparsely. The intervals gradually become larger along from the area facing the low voltage sections 30b toward the area facing the high voltage sections 30a.

The areas of the dots 62 become smaller and the intervals between the dots 62 become larger along from the area facing the low voltage sections 30b of the cold cathode tube 17 toward the area facing the high voltage sections 30a. Therefore, the dot pattern occupancy of the dots 62 is higher in the area facing the low voltage sections 30b than in the area facing the high voltage sections 30a.

The arrangements of the dots 62 in the narrow pitch area 17a and the wide pitch areas 17b of the cold cathode tubes 17 are the same as the third embodiment. Namely, the intervals between the dots 62 are smaller in the wide pitch areas 17b than in the narrow pitch area 17a. With this configuration, the dot pattern occupancy of the dots 62 is higher in the wide pitch areas 17b than in the narrow pitch area 17a.

According to the backlight device 12 of this embodiment, the dots 62 are formed such that the dot pattern occupancy that is a percentage of the total area of the dots 62 over the total area of the light reflecting sheet 60 is higher in the area facing the low voltage sections 30b of the cold cathode tubes 17 than in the area facing the high voltage sections 30a.

Because the dots 62 have the light reflectivity higher than the light reflecting sheet 60, the amount of the reflected light is relatively large in the area facing the low voltage sections 30b where the dot pattern occupancy is high. As a result, the illumination brightness increases. Therefore, the difference in the illumination brightness between the area facing the low voltage sections 30b and the area facing the high voltage sections 30a decreases.

In this embodiment, the dots 62 are formed such that the intervals between the dots 62 adjacent to each other in the axial direction of the cold cathode tubes 17 are smaller in the area facing the low voltage sections 30b than in the area facing the high voltage sections 30a.

Further, the dots 62 are formed such that the intervals between the dots 62 adjacent to each other in the parallel arrangement direction of the cold cathode tubes 17 are smaller in the area facing the low voltage sections 30b than in the area facing the high voltage sections 30a.

Still further, the dots 62 in the area facing the low voltage sections 30b have the larger areas than those in the area facing the high voltage sections 30a.

With this configuration, the dot pattern occupancy is higher in the area facing the low voltage sections 30b than in the area facing the high voltage sections 30a. The dots 62 have the light reflectivity higher than the light reflecting sheet 60. Namely, the amount of the reflected light is relatively large in the areas facing the low voltage sections 30b where the dot pattern occupancy is relatively high. As a result, the illumination brightness increases and thus the difference in the brightness between the area facing the low voltage sections 30b and the area facing the high voltage sections 30a decreases.

<Other Embodiments>

The present invention is not limited to the above embodiments explained in the above description. The following embodiments may be included in the technical scope of the present invention, for example.

(1) In the first and the second embodiments, the black dots are printed on the light reflecting sheets. However, other colors may be used as long as they are less likely to reflect light. Gray dots may be printed, for example. In this case, the light reflectivity of the dots is higher than that of the black dots and thus a difference in the amount of light reflected by the dots and the light reflecting sheet is not large in comparison to the black dots. Therefore, a larger number or a larger size of the dots should be formed to adjust the amount of the reflected light.

(2) In the third and the fourth embodiments, the dots containing the fluorescent whitening agent are printed on the light reflecting sheets. However, other methods, for example, a method for forming dots having shiny metal surfaces can be used as long as the dots are more likely to reflect light.

(3) In the above embodiments, the narrow pitch areas are provided in the central areas of the cold cathode tube arrangement and the wide pitch areas are provided in the end areas of the arrangement. However, the narrow pitch areas and the wide pitch areas may be formed in preferable locations. When the lighting device of the present invention is used for display devices, the narrow pitch areas are preferable to be located inner areas than the wide pitch areas with respect to the arrangement direction of the cold cathode tubes because the display devices require relatively high brightness in central areas of screens thereof.

Figure 10:
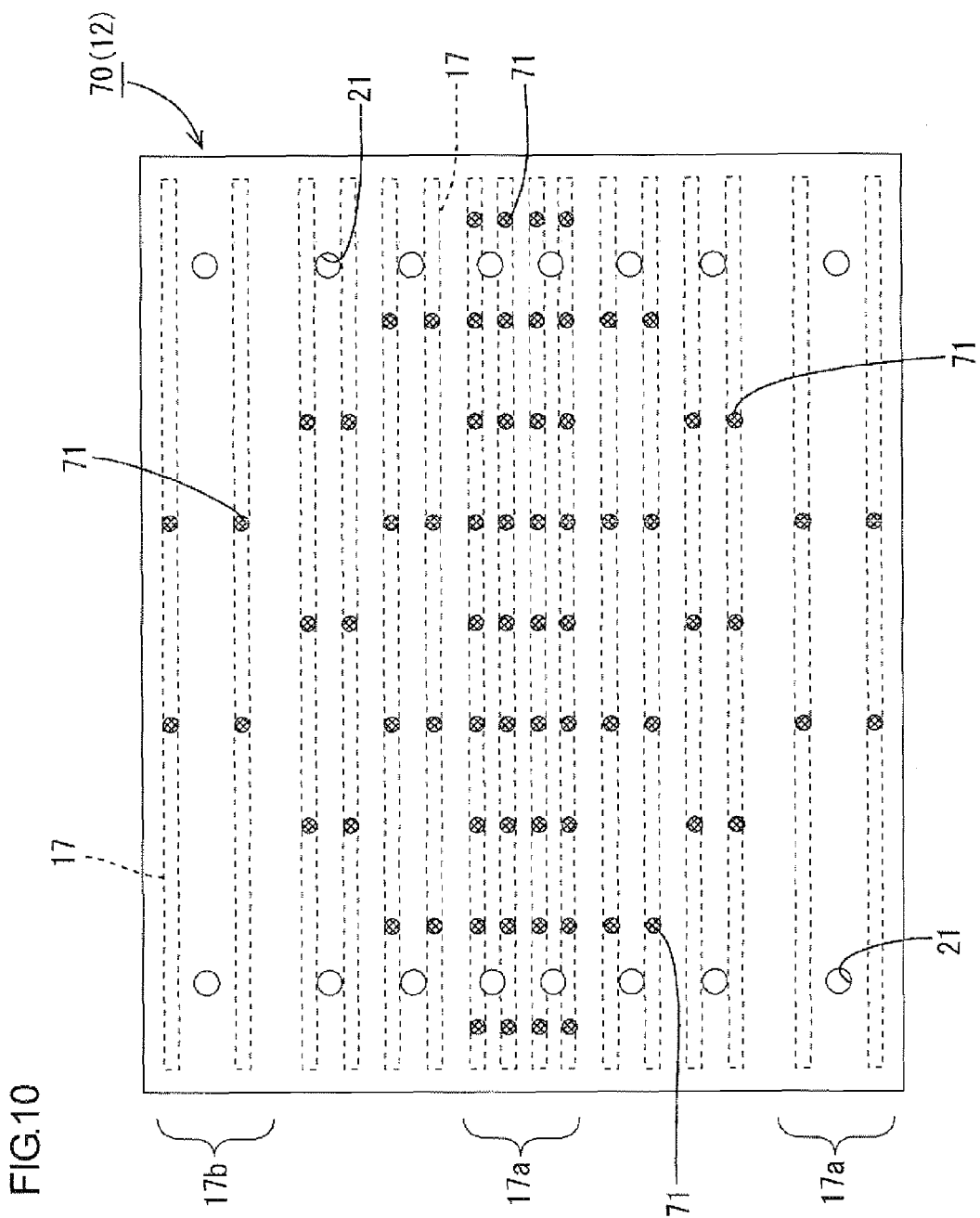
[FIG. 10] is a plan view illustrating a modification of the light reflecting sheet arranged in the backlight device.

(4) In the above embodiments, the dots are formed in arbitrary locations on the light reflecting sheets. However, as illustrated in FIG. 10, dots 71 may be formed on the light reflecting sheet 70 only directly behind the cold cathode tubes 17. A large difference in brightness between areas where the dots 71 formed on the light reflecting sheet 70 and areas therearound (i.e., areas where the dots are not formed) is produced. Therefore, shadows of the dots 71 may be viewed during display of images on the liquid crystal display device 10. By forming the dots 71 directly behind the cold cathode tubes 17 (so as to overlap), the cold cathode tubes 17 exist between eyes of a viewer who is looking at the liquid crystal display device 10 and the dots 71. Therefore, the shadows of the dots 71 are less likely to be viewed.

(5) In the above embodiments, the dots are formed by printing on the light reflecting sheets. However, other methods including a metal evaporation method can be used when forming the dots with a metal containing material. In this case, areas where the dots are not formed should be masked.

Figure 11:
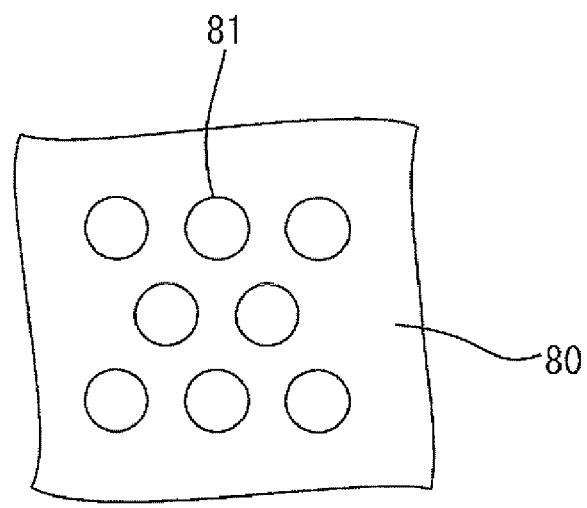
[FIG. 11] is an explanatory view illustrating a modification of a dot pattern.
Figure 12:
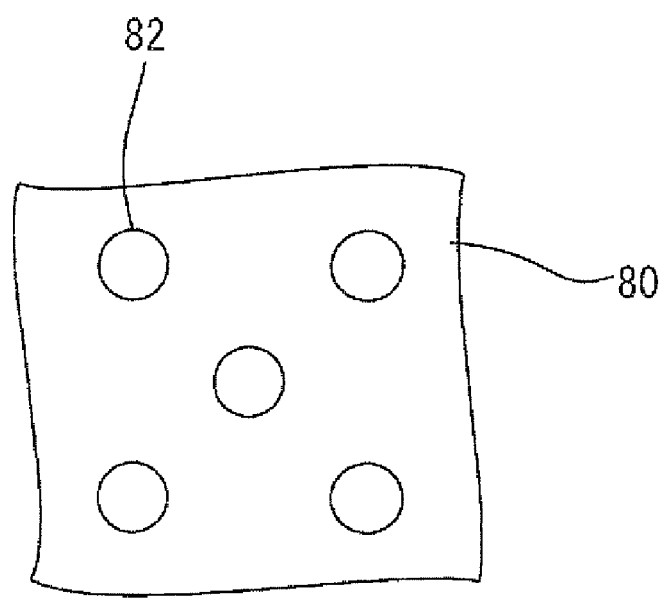
[FIG. 12] is an explanatory view illustrating a modification of a dot pattern.
Figure 13:
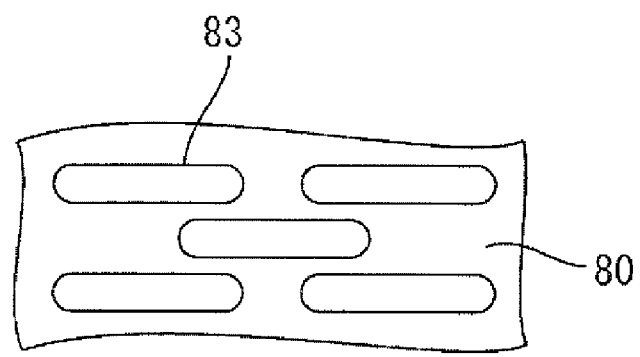
[FIG. 13] is an explanatory view illustrating a modification of a dot pattern.
Figure 14:
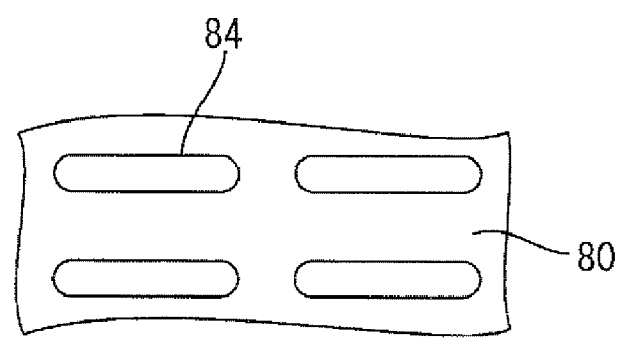
[FIG. 14] is an explanatory view illustrating a modification of a dot pattern.
Figure 15:
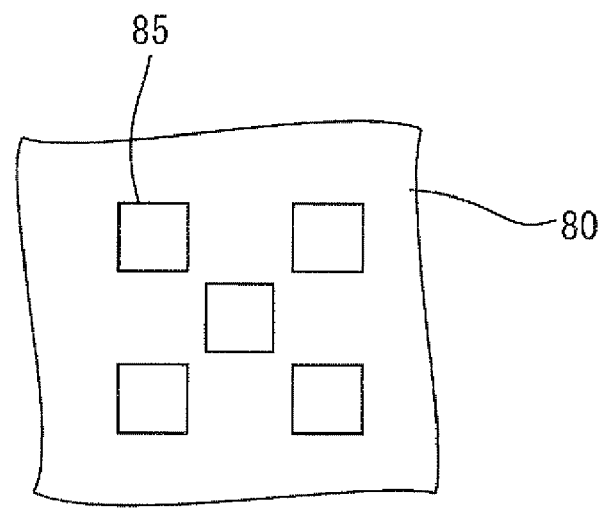
[FIG. 15] is an explanatory view illustrating a modification of a dot pattern.
Figure 16:
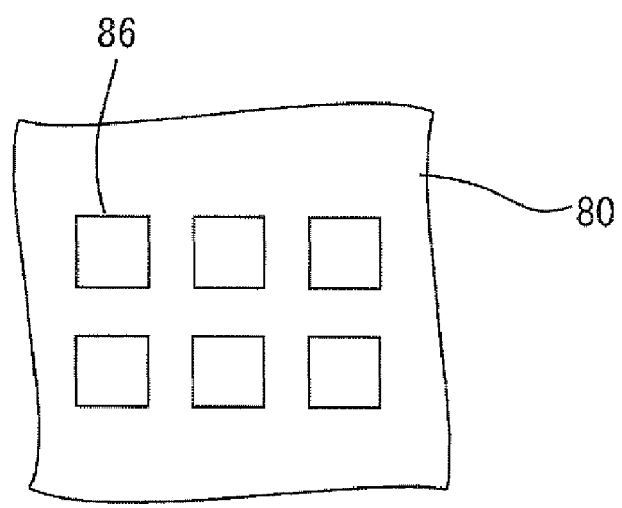
[FIG. 16] is an explanatory view illustrating a modification of a dot pattern.
Figure 17:
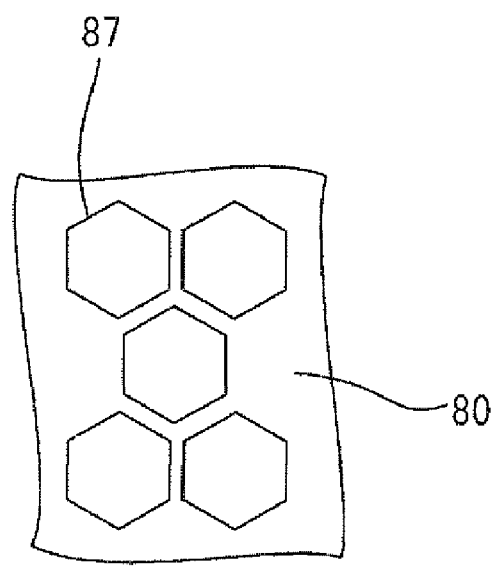
[FIG. 17] is an explanatory view illustrating a modification of a dot pattern.
Figure 18:
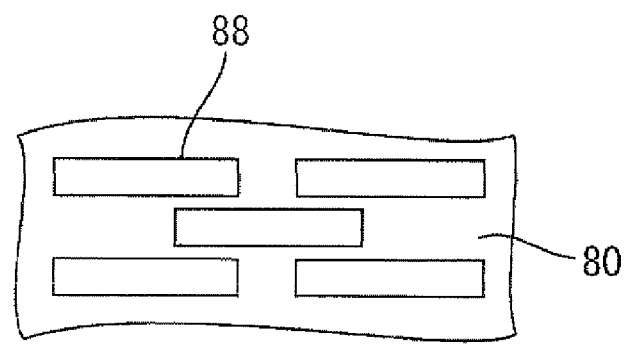
[FIG. 18] is an explanatory view illustrating a modification of a dot pattern.
Figure 19:
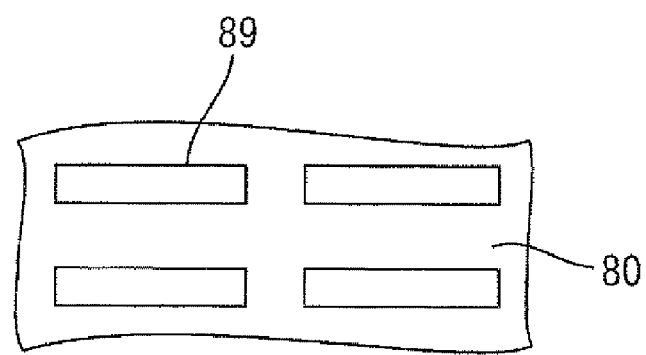
[FIG. 19] is an explanatory view illustrating a modification of a dot pattern.

(6) In the above embodiments, the dots are formed in round shapes and in parallel arrangements (round dots in parallel arrangements). However, the shapes and the arrangements are not limited to the above. For example, as illustrated in FIG. 11, round dots 81 may be arranged on a light reflecting sheet 80 in a zigzag arrangement at a 60-degree angle. This type of dots and arrangement thereof is referred to as a 60-degree zigzag arrangement of round dots. A right angle zigzag arrangement of round dots in which round dots 82 are arranged in a zigzag 90-degree angle as illustrated in FIG. 12 can be used. A zigzag arrangement of oval dots in which oval dots 83 are arranged in a zigzag pattern as illustrated in FIG. 13 can be used. A parallel arrangement of oval dots in which oval dots 84 are arranged in a parallel arrangement as illustrated in FIG. 14 can be used. A zigzag arrangement of square dots in which square dots 85 are arranged in a zigzag pattern as illustrated in FIG. 15 can be used. A parallel arrangement of square dots in which square dots 86 are arranged in a parallel arrangement as illustrated in FIG. 16 can be used. A 60-degree zigzag arrangement of hexagonal dots in which hexagonal dots 87 are arranged in a zigzag arrangement at a 60-degree angle as illustrated in FIG. 17 can be used. A zigzag arrangement of rectangular dots in which rectangular dots 88 are arranged in a zigzag arrangement as illustrated in FIG. 18 can be used. A parallel arrangement of rectangular dots in which rectangular dots 89 are arranged in a parallel arrangement as illustrated in FIG. 19 can be used.

(7) In the above embodiments, the dots are formed in the same shape. However, the dots can be formed on the light reflecting sheet in different shapes.

(8) In the above embodiments, the cold cathode tubes are used as light sources. However, other types of light sources including hot cathode tubes can be used.

(9) In the above embodiments, the TFTs are used as switching components of the liquid crystal display device 10. However, the present invention can be applied to liquid crystal devices that use switching components other than the TFTs (e.g., thin film diodes (TFDs)). It also can be applied to a black and white liquid crystal display device other than the color liquid crystal display device.

(10) In the above embodiment, the liquid crystal display device using the liquid crystal panel 11 as a display panel. However, the present invention can be applied to display devices using different types of display panels.

TABLE 1

|  | Light reflectivity (%) | Dot pattern occupancy (%) | Average light reflectivity (%) |
|---|---|---|---|
| Light reflecting sheet | 97.7 | — | 97.7 |
| Black dot | 6.6 | 8.5 | 90.0 |
|  |  | 4.2 | 93.9 |
|  |  | 1.4 | 96.5 |
| Gray dot | 51.8 | 8.5 | 93.8 |
|  |  | 4.2 | 95.8 |
|  |  | 1.4 | 97.1 |

TABLE 2

|  | Light reflectivity (%) | Dot pattern occupancy (%) | Average light reflectivity (%) |
|---|---|---|---|
| Light reflecting sheet | 97.7 | — | 97.7 |
| Dot with fluorescent whitening agent | 98.8 | 8.5 | 97.8 |

The invention claimed is:

1. A lighting device comprising:
a plurality of light sources provided in a parallel arrangement; and
a light reflecting member disposed on a side opposite from an illuminating side that is illuminated with light from said light sources, wherein:
the parallel arrangement of said light sources includes a narrow pitch area in which an interval between said light sources is relatively small and a wide pitch area in which an interval between said light sources is relatively large;
said light reflecting member includes a dot pattern in which a plurality of dots are arranged;
said plurality of dots have light reflectivity different from light reflectivity of said light reflecting member;
said light reflecting member and said dot pattern have surfaces that form a light reflecting surface; and
said light reflecting surface has light reflectivity that is lower in said narrow pitch area than in said wide pitch area.

2. The lighting device according to claim 1, wherein:
said narrow pitch area is provided in a central area of the parallel arrangement of said light sources; and
said wide pitch area is provided in an end area of the parallel arrangement of said light sources.

3. The lighting device according to claim 1, wherein:
the light reflectivity of said dots is lower than that of said light reflecting member;
said dot pattern is formed such that a dot pattern occupancy that is a percentage of a total area of said dots over a total area of said light reflecting member is higher in said narrow pitch area than in said wide pitch area.

4. The lighting device according to claim 3, wherein a plurality of said dots are arranged along an axial direction of said light sources such that an interval between said dots adjacent to each other in the axial direction is smaller in the narrow pitch area than in the wide pitch area.

5. The lighting device according to claim 3, wherein a plurality of said dots are arranged along a parallel arrangement direction of said light sources such that an interval between said dots adjacent to each other in the parallel arrangement direction is smaller in the narrow pitch area than in the wide pitch area.

6. The lighting device according to claim 3, wherein each of said dots in the narrow pitch area has a larger area than each of said dots in the wide pitch area.

7. The lighting device according to claim 3, wherein:
each of said light sources includes a high voltage section at which a voltage is relatively high and a low voltage section at which a voltage is relatively low; and
said dots are provided such that said dot pattern occupancy is higher in an area facing said high voltage section than in an area facing said low voltage section.

8. The lighting device according to claim 7, wherein a plurality of said dots are arranged along the axial direction of said light sources such that an interval between said dots adjacent to each other in the axial direction is smaller in the area facing said high voltage section than in the area facing low voltage section.

9. The lighting device according to claim 7, wherein a plurality of said dots are arranged along the parallel arrangement direction of said light sources such that an interval between said dots adjacent to each other in the parallel arrangement direction is smaller in the area facing said high voltage section than in the area facing low voltage section.

10. The lighting device according to claim 7, wherein each of said dots in the area facing said high voltage section has a larger area than each of said dots in the area facing said low voltage section.

11. The lighting device according to claim 1, wherein:
the light reflectivity of said dots is higher than that of said light reflecting member;
said dot pattern is formed such that a dot pattern occupancy that is a percentage of a total area of said dots over a total area of said light reflecting member is higher in said wide pitch area than in said narrow pitch area.

12. The lighting device according to claim 11, wherein a plurality of said dots are arranged along an axial direction of said light sources such that an interval between said dots adjacent to each other in the axial direction is smaller in the wide pitch area than in the narrow pitch area.

13. The lighting device according to claim 11, wherein a plurality of said dots are arranged along a parallel arrangement direction of said light sources such that an interval between said dots adjacent to each other in the parallel arrangement direction is smaller in the wide pitch area than in the narrow pitch area.

14. The lighting device according to claim 11, wherein each of said dots in the wide pitch area has a larger area than each of said dots in the narrow pitch area.

15. The lighting device according to claim 11, wherein:
each of said light sources includes a high voltage section at which a voltage is relatively high and a low voltage section at which a voltage is relatively low; and
said dots are provided such that said dot pattern occupancy is higher in an area facing said low voltage section than in an area facing said high voltage section.

16. The lighting device according to claim 15, wherein a plurality of said dots are arranged along the axial direction of said light sources such that an interval between said dots adjacent to each other in the axial direction is smaller in the area facing said low voltage section than in the area facing high voltage section.

17. The lighting device according to claim 15, wherein a plurality of said dots are arranged along the parallel arrangement direction of said light sources such that an interval between said dots adjacent to each other in the parallel arrangement direction is smaller in the area facing said low voltage section than in the area facing said high voltage section.

18. The lighting device according to claim 15, wherein each of said dots in the area facing said low voltage section has a larger area than each of said dots in the area facing said high voltage section.

19. The lighting device according to claim 1, wherein said dot pattern is provided in areas of said light reflecting member directly behind said light sources.

20. A display device comprising:
a lighting device according to claim 1; and
a display panel disposed in front of said lighting device.

21. The display device according to claim 20, wherein the said display panel is a liquid crystal display panel including liquid crystal sealed between a pair of substrates.

22. A television receiver comprising a display device according to claim 20.

\* \* \* \* \*